US011036914B2

(12) United States Patent
Hamlin et al.

(10) Patent No.: US 11,036,914 B2
(45) Date of Patent: Jun. 15, 2021

(54) AUTOMATIC LAYOUT ENGINE

(71) Applicant: salesforce.com, inc., San Francisco, CA (US)

(72) Inventors: Drew Hamlin, San Francisco, CA (US); Andrew Chung, San Francisco, CA (US); William Joseph Flynn, III, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 564 days.

(21) Appl. No.: 15/637,717

(22) Filed: Jun. 29, 2017

(65) Prior Publication Data
US 2019/0004686 A1    Jan. 3, 2019

(51) Int. Cl.
| | | |
|---|---|---|
| *G06F 40/00* | (2020.01) | |
| *G06F 40/103* | (2020.01) | |
| *G06F 3/0484* | (2013.01) | |
| *G06F 3/0486* | (2013.01) | |
| *G06F 3/0488* | (2013.01) | |
| *G06F 40/106* | (2020.01) | |
| *G06F 40/166* | (2020.01) | |

(52) U.S. Cl.
CPC .......... *G06F 40/103* (2020.01); *G06F 3/0486* (2013.01); *G06F 3/04845* (2013.01); *G06F 3/04883* (2013.01); *G06F 40/106* (2020.01); *G06F 40/166* (2020.01)

(58) Field of Classification Search
CPC .............. G06F 3/04845; G06F 3/0486; G06F 3/04883; G06F 17/212; G06F 40/106; G06F 40/103; G06F 40/166

USPC .......................... 715/730, 731, 732
See application file for complete search history.

(56) References Cited

U.S. PATENT DOCUMENTS

| | | | | | |
|---|---|---|---|---|---|
| 5,860,073 | A | * | 1/1999 | Ferrel | G06F 40/117 715/255 |
| 6,161,114 | A | * | 12/2000 | King | G06F 40/14 715/202 |
| 8,091,036 | B1 | * | 1/2012 | Pavek | G06F 8/38 715/762 |

(Continued)

OTHER PUBLICATIONS

Presentation Mode in Evernote (https://www.youtube.com/watch?v=RImpdq3wmX8), Published on May 14, 2014.

(Continued)

*Primary Examiner* — Cesar B Paula
*Assistant Examiner* — David Faber
(74) *Attorney, Agent, or Firm* — Sterne, Kessler, Goldstein & Fox P.L.L.C.

(57) ABSTRACT

Disclosed herein are system, method, and computer program product embodiments for performing automatic layout of an object in a presentation slide. An embodiment operates by implementing a graphical user interface defining a plurality of layout segments on a presentation slide. The embodiment receives an object from a user via an input gesture. The embodiment determines the object is in a layout segment of the plurality of layout segments. The embodiment determines a layout rule based on the determined layout segment and a property of the object. The embodiment then modifies the object based on the determined layout segment. The embodiment outputs a layout result based on the presentation slide and the modified object.

15 Claims, 7 Drawing Sheets

(56) References Cited

U.S. PATENT DOCUMENTS

| | | | | |
|---|---|---|---|---|
| 8,434,002 B1* | 4/2013 | Shah | G06F 40/106 | 715/255 |
| 9,239,822 B1* | 1/2016 | Greco | G06T 11/60 | |
| 9,513,763 B1* | 12/2016 | Adams | G06F 3/0481 | |
| 2004/0003350 A1* | 1/2004 | Simmons | G06T 11/60 | 715/244 |
| 2008/0235585 A1* | 9/2008 | Hart | G06F 16/44 | 715/717 |
| 2008/0313533 A1* | 12/2008 | Hoyer | G06F 40/103 | 715/243 |
| 2010/0088605 A1* | 4/2010 | Livshin | G06F 17/212 | 715/731 |
| 2010/0185949 A1* | 7/2010 | Jaeger | G06F 3/0481 | 715/730 |
| 2011/0078560 A1* | 3/2011 | Weeldreyer | G06F 17/214 | 715/255 |
| 2011/0302494 A1* | 12/2011 | Callery | G06F 16/4393 | 715/732 |
| 2012/0162266 A1* | 6/2012 | Douglas | G06F 3/0481 | 345/677 |
| 2012/0278696 A1* | 11/2012 | Carper | G06F 17/245 | 715/234 |
| 2013/0093764 A1* | 4/2013 | Andersson | G06F 3/04817 | 345/419 |
| 2013/0239049 A1* | 9/2013 | Perrodin | G06F 3/0481 | 715/800 |
| 2013/0290858 A1* | 10/2013 | Beveridge | G06F 3/0484 | 715/740 |
| 2014/0025619 A1* | 1/2014 | Michelstein | G06F 17/211 | 706/47 |
| 2014/0282013 A1* | 9/2014 | Amijee | G06F 3/0482 | 715/732 |
| 2015/0067519 A1* | 3/2015 | Missig | G06F 3/04842 | 715/732 |
| 2016/0026376 A1* | 1/2016 | Schultink | G06F 3/04847 | 715/731 |
| 2016/0103601 A1* | 4/2016 | Stein Fl | G06F 3/0482 | 715/202 |
| 2016/0188125 A1* | 6/2016 | Kaplan | G06F 3/0481 | 715/730 |
| 2016/0266864 A1 | 9/2016 | Rajendran et al. | | |
| 2016/0321223 A1* | 11/2016 | Pak | G06F 3/04883 | |
| 2016/0371312 A1* | 12/2016 | Ben-Aharon | G06F 17/212 | |
| 2017/0316091 A1* | 11/2017 | Edge | G06F 17/21 | |
| 2018/0129634 A1* | 5/2018 | Sivaji | G06F 40/177 | |
| 2018/0253211 A1* | 9/2018 | Ruby | G06F 3/04812 | |
| 2018/0335914 A1* | 11/2018 | Nilo | G06F 3/04817 | |

OTHER PUBLICATIONS

Weverka, P., "PowerPoint 2007 for Dummies," Wiley Publishing, 2007, 675 pages.

* cited by examiner

AUTOMATIC LAYOUT ENGINE

CROSS REFERENCE TO RELATED APPLICATIONS

This application is related to co-pending U.S. patent application Ser. No. 15/637,729, filed Jun. 29, 2017, entitled "Presentation Collaboration with Various Electronic Devices,", to U.S. patent application Ser. No. 15/637,096, filed Jun. 29, 2017, entitled "Color Theme Maintenance For Presentations,", to U.S. patent application Ser. No. 15/637,762, filed Jun. 29, 2017, entitled "Permission Management Of Cloud-Based Documents,", and to U.S. patent application Ser. No. 15/637,077, filed Jun. 29, 2017, entitled "Smart Defaults Based On Previous Settings For Presentation Slides,", all of which are incorporated herein by reference in their entireties.

BACKGROUND

A user often wants to quickly create a slide show that looks great on a variety of different electronic devices. But a user is often unable to quickly create a slide show that looks great on a variety of different electronic devices using traditional presentation software. This is because traditional presentation software often requires a user to select a layout template prior to adding content to a slide. The layout template may define how content is presented on a slide. For example, the layout template may provide predefined locations in which a user can insert objects such as pictures, shapes, videos, and text. This may require the user to insert an object into one of the locations and adjust the size and position of the object. The user may also need to rearrange other objects on the slide. If the user decides they do not like the layout template, the user may need to select a different layout template and reconfigure the objects. This process is tedious and error prone because the user may need to repeatedly change the layout template and adjust the size and position of the objects on the slide. This process also often results in slides that do not look great and suffer from poor design practices.

In addition, a user may want to ensure that their slide show looks great on different electronic devices. For example, a user may want to ensure that their slide show looks great when projected on a large screen and when displayed on a smartphone. But traditional presentation software may require a user to create different versions of a presentation tailored to each device's unique display size, display orientation, and graphical rendering capabilities. This process is tedious, error prone, and often results in a presentation that is being displayed incorrectly or inconsistently on different electronic devices.

Thus, what is needed is a way for users to quickly create a slide show that looks great on a variety of different electronic devices.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatic layout of objects on a slide of a presentation. Further provided herein are system, apparatus, device, method and/or computer program product embodiments, and/or combinations and sub-combinations thereof, for displaying a presentation on different types of electronic devices.

Figure 1:
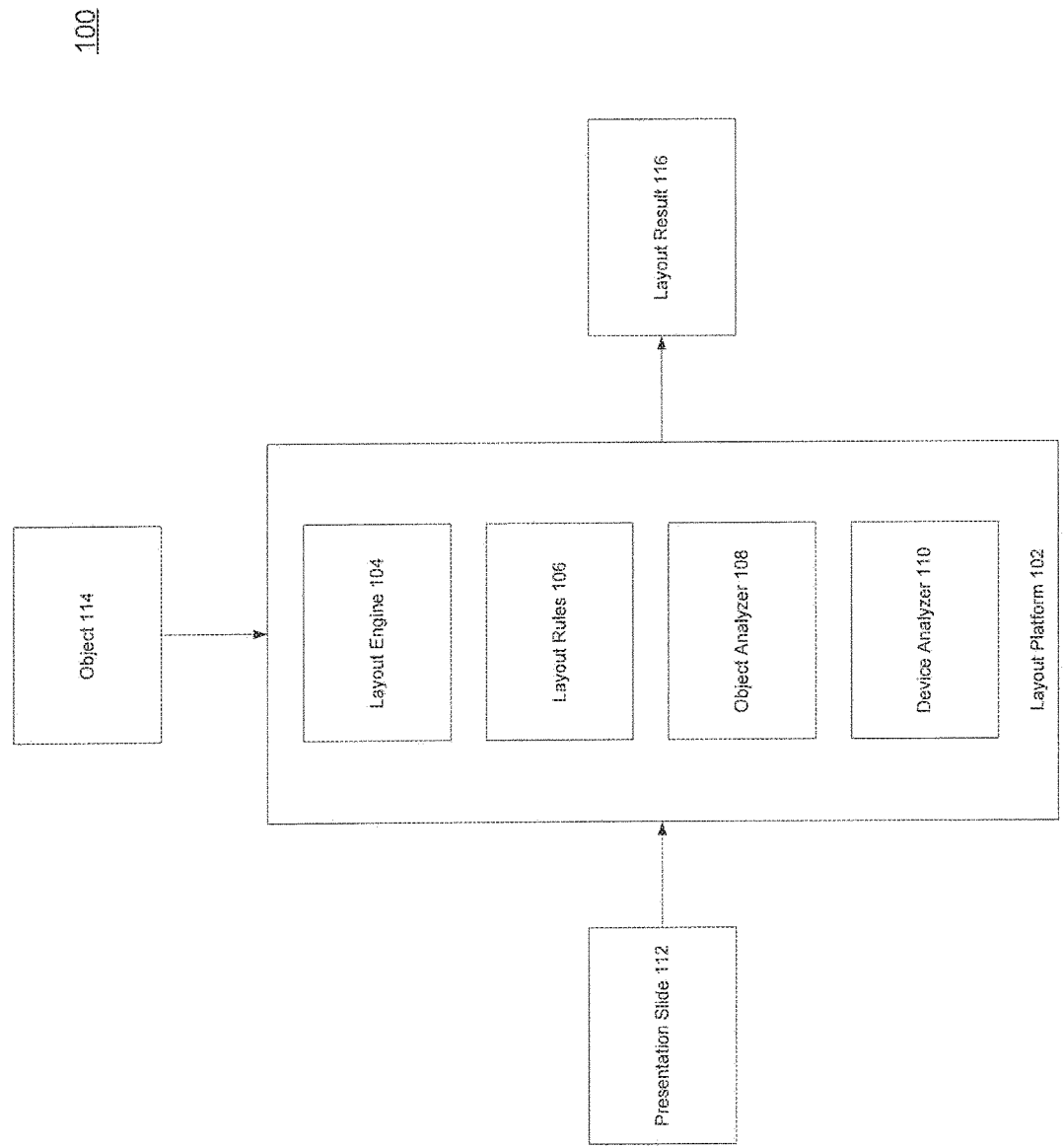
FIG. 1 is a block diagram of an automatic layout system, according to some embodiments.

FIG. 1 is a block diagram of an automatic layout system 100, according to some embodiments. Automatic layout system 100 automatically positions, sizes, and transforms an object inserted into a presentation by a user. Automatic layout system 100 also automatically positions, sizes, and transforms an object inserted into a presentation for display on a particular type of electronic device. Automatic layout system 100 includes layout platform 102, a presentation slide 112, an object 114, and a layout result 116.

In some embodiments, presentation slide 112 is a slide in a presentation. As would be appreciated by a person of ordinary skill in the art, the features described herein with respect to presentation slide 112 may also be applied to a desktop publishing document, photomontage, pamphlet, handout, poster, or various other types of documents.

In some embodiments, a presentation may include multiple presentation slides 112. A presentation program may display the presentation slides 112 as a slide show.

In some embodiments, presentation slide 112 may include one or more objects 114. An object 114 may be a picture, shape, video, animation, text block, or various other types of content as would be appreciated by a person of ordinary skill in the art.

In some embodiments, a user may insert an object 114 into presentation slide 112 using an input gesture. For example, a user may insert an object 114 into presentation slide 112 by dragging and dropping the object 114 onto presentation slide 112 using a computer mouse or touchpad. A user may also insert an object 114 into presentation slide 112 by dragging and dropping the object 114 onto presentation slide 112 using a touch gesture. As would be appreciated by a person of ordinary skill in the art, a user may insert an object 114 into presentation slide 112 using various other types of input gestures.

In some embodiments, layout platform 102 may automatically position, size, and transform an object 114 in response to a user inserting it into presentation slide 112. Layout platform 102 may also automatically position, size, and transform one or more other objects in presentation slide 112 in response to a user inserting an object 114 into presentation slide 112. Layout platform 102 may also automatically position, size, and transform an object 114 for display on a particular type of electronic device based on one or more device characteristics of the electronic device.

In some embodiments, layout platform 102 produces a layout result 116 in response to a user inserting an object 114 into presentation slide 112. Layout result 116 may represent the modification of presentation slide 112 by layout platform 102. In other words, layout result 116 may be presentation slide 112 containing an object 114 modified by layout platform 102.

In some embodiments, layout platform 102 may be implemented on a desktop computer, server computer, laptop, tablet, smartphone, or other electronic device as would be appreciated by person of ordinary skill in the art. In some other embodiments, layout platform 102 may be implemented in a cloud computing platform.

In some embodiments, layout platform 102 includes a layout engine 104, layout rules 106, object analyzer 108, and device analyzer 110. As would be appreciated by a person of ordinary skill in the art, layout platform 102 may include only a portion of these elements. For example, layout platform 102 may not include device analyzer 110.

In some embodiments, layout engine 104 may modify one or more properties of an object 114 in response to a user inserting the object 114 into presentation slide 112. For example, layout engine 104 may modify one or more properties of an object 114 in response to a user inserting the object 114 into presentation slide 112 using a input gesture. As would be appreciated by a person of ordinary skill in the art, layout engine 104 may modify various types of properties of an object 114 including, but not limited to, the position, size, orientation, and color of the object 114.

In some embodiments, layout engine 104 may modify one or more properties of an object 114 for display on an electronic device based on one or more device characteristics of the electronic device. For example, layout engine 104 may modify one or more properties of an object 114 for display on an electronic device based on the electronic device having a small portrait oriented screen. For example, layout engine 104 may change the orientation of an object 114 from landscape to portrait in response to presentation slide 112 being displayed on a smartphone having a portrait oriented screen.

In some embodiments, layout engine 104 may modify an object 114 based on one or more layout rules in layout rules 106. For example, layout engine 104 may modify the position, size, orientation, and or color of an object 114 based on one or more layout rules in layout rules 106.

In some embodiments, layout rules 106 may be a configuration file that defines one or more layout rules. A layout rule in layout rules 106 may define a set of style preferences that layout engine 104 uses to modify an object 114.

In some embodiments, a layout rule in layout rules 106 may specify style preferences as one or more operations to be performed on an object 114 by layout engine 104. For example, a layout rule in layout rules 106 may specify one or more scale, crop, and or rotate operations. As would be appreciated by a person of ordinary skill in the art, a layout rule may specify various other types of operations. Moreover, as would be appreciated by a person of ordinary skill in the art, a layout rule may specify one or more operations for multiple objects 114.

In some embodiments, a layout rule in layout rules 106 may also specify style preferences as one or more actions to be associated with object 114 by layout engine 104. This overcomes a problem with traditional presentation software which does not provide a way for a user to directly interact with an object in a presentation. For example, a user viewing a presentation containing a picture on a smartphone cannot tap the picture to display a full screen version of the picture. Embodiments herein solve this problem. For example, a layout rule in layout rules 106 may specify a full screen action be associated with an object 114 when presentation slide 112 is being displayed on a small screen. Thus, when a user taps the object 114 in presentation slide 112, the object 114 is displayed full screen. As would be appreciated by a person of ordinary skill in the art, a layout rule may specify various other types of actions.

In some embodiments, layout engine 104 may determine one or more layout rules to apply to object 114 based one or more properties of an object 114. Layout engine 104 may also determine one or more layout rules to apply to an object 114 based one or more device characteristics of an electronic device that displays presentation slide 112. Layout engine 104 may also determine one or more layout rules to apply to an object 114 based on a layout segment that contains object 114. As would be appreciated by a person of ordinary skill in the art, layout engine 104 may determine one or more layout rules to apply to an object 114 based on a combination of the above.

In some embodiments, a layout rule in layout rules 106 may specify one or more conditions and associated operations. Layout engine 104 may apply the associated operations in response to the one or more conditions being true. In some embodiments, a condition may specify that layout engine 104 apply the associated operations when an object 114 is in a particular layout segment. In some embodiments, a condition may specify that layout engine 104 apply the associated operations when the electronic device displaying presentation slide 112 has one or more device characteristics. In some embodiments, a condition may specify that layout engine 104 apply the associated operations when an object 114 has one or more properties. As would be appreciated by a person of ordinary skill in the art, a condition may specify that layout engine 104 apply the associated operations based on a combination of the above.

In some embodiments, a layout rule in layout rules 106 may specify the one or more conditions and associated operations in configuration file. In some embodiments, the configuration file may be text format file. For example, configuration file may specify the one or more conditions and associated operations using JavaScript Object Notation (JSON), Extensible Markup Language (XML), or various other data formats.

In some embodiments, layout engine 104 may select one or more layout rules in layout rules 106 based on one or more properties of an object 114. In some embodiments, a property of an object 114 may include a type, a size, an orientation, or a color of the object 114. As would be appreciated by a person of ordinary skill in the art, an object 114 may include various other properties.

For example, layout engine 104 may select a first layout rule to apply to an object 114 based on the object 114 being a picture, and second layout rule to apply to an object 114 based on the object 114 being a video. As would be appreciated by a person of ordinary skill in the art, layout engine 104 may apply one or more layout rules to an object 114 based on various other types of properties of the object 114.

In some embodiments, layout engine 104 may determine the one or more properties of an object 114 using object analyzer 108. Object analyzer 108 may determine one or more properties of an object 114 in response to the insertion of the object 114 into presentation slide 112. For example, object analyzer 108 may determine a type, size, and or orientation of the object 114. As would be appreciated by a person of ordinary skill in the art, object analyzer 108 may determine other types of properties of an object 114.

In some embodiments, layout engine 104 may determine one or more layout rules to apply to an object 114 based one or more device characteristics of an electronic device that displays presentation slide 112. For example, layout engine 104 may select a first layout rule to apply to an object 114 based on displaying presentation slide 112 on a desktop computer, and a second layout rule to apply to the object 114 based on displaying presentation slide 112 on a smartphone. As would be appreciated by a person of ordinary skill in the art, layout engine 104 may apply one or more layout rules to an object 114 based on various types of device characteristics of an electronic device that displays presentation slide 112. For example, layout engine 104 may apply one or more layout rules based on display screen size, display screen orientation, graphical rendering capabilities, display screen brightness, power usage, color depth capability, memory size, and an input capability of an electronic device that displays presentation slide 112.

In some embodiments, layout engine 104 may apply one or more layout rules to an object 114 based on various types of device characteristics of an electronic device that displays presentation slide 112 according to the layout segment that contains the object 114. This allows layout engine 104 to position and size the object 114 relative to both the layout segment that contains the object 114 and the properties of the electronic device that displays presentation slide 112.

In some embodiments, layout engine 104 may determine the one or more device characteristics of an electronic device that displays presentation slide 112 using device analyzer 110. Device analyzer 110 may determine one or more device characteristics of an electronic device upon display of presentation slide 112 on the electronic device. For example, device analyzer 110 may determine a display screen size, display screen orientation, and or graphical rendering capabilities of the electronic device. As would be appreciated by a person of ordinary skill in the art, device analyzer 110 may determine other device characteristics of the electronic device upon display of presentation slide 112 on the electronic device.

In some embodiments, layout engine 104 may determine one or more layout rules to apply to an object 114 based on a layout segment that contains the object 114. In some embodiments, layout engine 104 may divide presentation slide 112 into a plurality of layout segments. For example, layout engine may implement a graphical user interface on top of presentation slide 112. In some embodiments, the graphical user interface may include a series of vertical gridlines that divide presentation slide 112 into a plurality of layout segments. In some other embodiments, the graphical user interface may include a series of horizontal gridlines that divide presentation slide 112 into a plurality of layout segments. As would be appreciated by a person of ordinary skill in the art, the graphical user interface may divide presentation slide 112 into various numbers, sizes, and shapes of layout segments.

In some embodiments, one or more layout rules in layout rules 106 may be associated with a layout segment in the plurality layout segments. For example, a visual designer may associate one or more layout rules with a layout segment in the plurality of layout segments.

Figure 2:
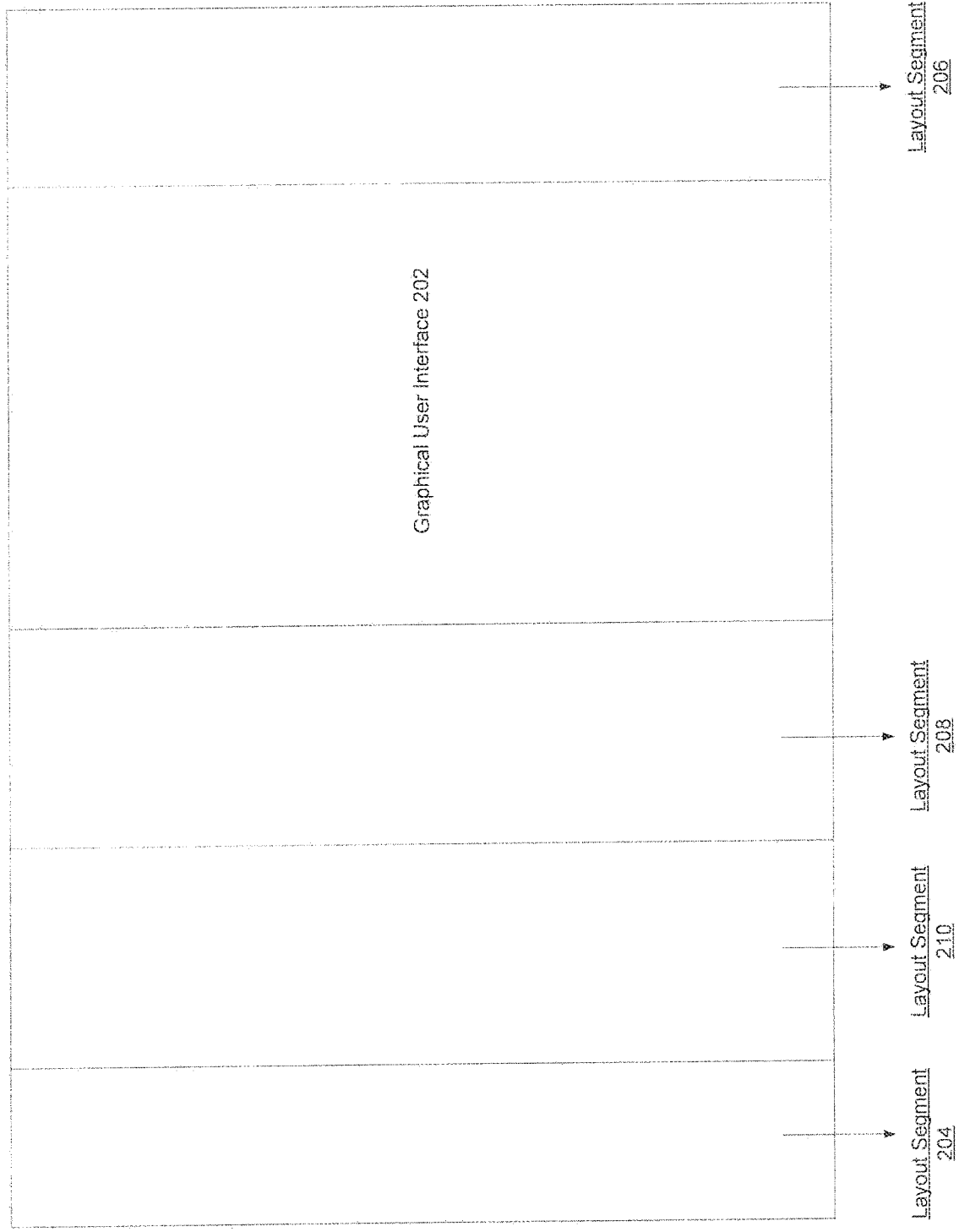
FIG. 2 illustrates a graphical user interface on top of a presentation slide that defines a plurality of layout segments for the presentation slide, according to some embodiments.

FIG. 2 illustrates a graphical user interface 202 on top of presentation slide 112 that defines a plurality of layout segments for presentation slide 112, according to an example embodiment. As would be appreciated by a person of ordinary skill in the art, graphical user interface 202 may be applied to various other types of content including, but not limited to, a desktop publishing document, photomontage, pamphlet, handout, or poster. FIG. 2 is discussed with respect to FIGS. 1 and 3A-3D. FIGS. 3A-3D illustrate various layout results outputted by layout engine 104 when an object 114 is inserted into different layout segments defined by graphical user interface 202, according to example embodiments.

In FIG. 2, layout engine 104 displays graphical user interface 202 for presentation slide 112. Layout engine 104 may display graphical user interface 202 as a graphical overlay on top of presentation slide 112. Graphical user interface 202 includes layout segments 204, 206, 208, and 210. In some embodiments, layout segments 204, 206, 208, and 210 provide relative positioning of one or more objects 114 in presentation slide 112. Layout segments 204, 206, 208, and 210 may also be associated with one or more layout rules in layout rules 106. As would be appreciated by a person of ordinary skill in the art, graphical user interface 202 may define various numbers, sizes, and shapes of layout segments.

In some embodiments, graphical user interface 202 defines layout segments 204, 206, 208, and 210 using vertical gridlines. As would be appreciated by a person of ordinary skill in the art, graphical user interface 202 may define layout segments using other dividing mechanisms.

In some embodiments, layout engine 104 may display graphical user interface 202 when an object 114 is being inserted into presentation slide 112. In some other embodiments, layout engine 104 may display graphical user interface 202 independent of insertion of an object 114 into presentation slide 112.

In some embodiments, in response to a user inserting an object 114 into a given layout segment of layout segments 204, 206, 208, and 210, layout engine 104 applies one or more layout rules from layout rules 106 to the object 114. This causes layout engine 104 to produce layout result 116. Layout result 116 represents a modification and change of layout of one or more objects 114 in presentation slide 112. Layout engine 104 may output layout result 116 by applying one or more operations defined by one or more layout rules in layout rules 106 to the object 114. Layout engine 104 may also apply one or more operations defined by one or more layout rules in layout rules 106 to other objects in presentation slide 112.

Figure 3A:
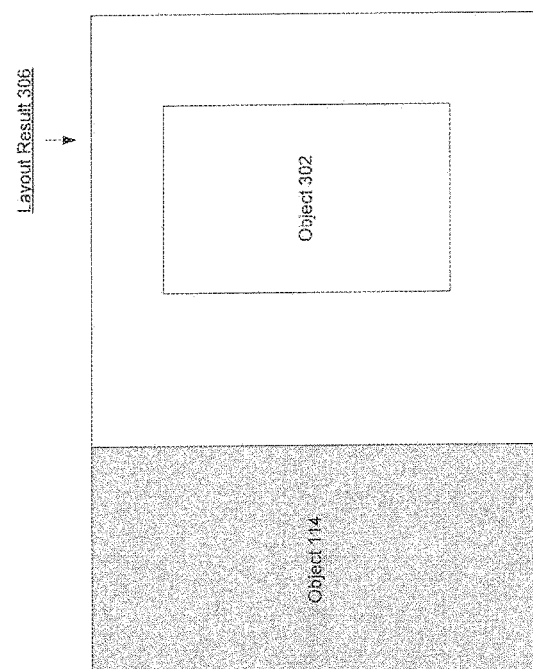
FIG. 3A illustrates a layout result in response to a user inserting an object into a layout segment, according to some embodiments.

For example, in FIG. 3A, layout engine 104 outputs layout result 306 in response to a user inserting an object 114 into layout segment 204. Layout engine 104 resizes and repositions object 114 as shown in layout result 306. Layout engine 104 also resizes and centers another object (e.g., object 302) in presentation slide 112 in response to the insertion of object 114 into layout segment 204.

Figure 3B:
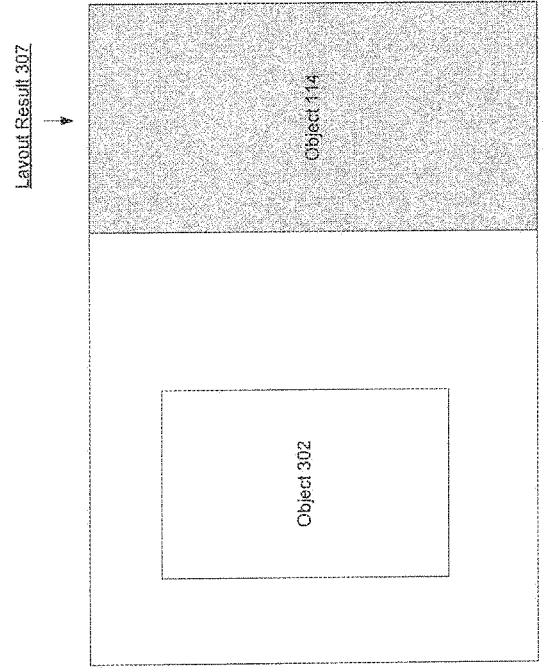
FIG. 3B illustrates a layout result in response to a user inserting an object into a layout segment, according to some embodiments.

In FIG. 3B, layout engine 104 outputs layout result 307 in response to a user inserting an object 114 into layout segment 206. Layout engine 104 resizes and repositions object 114 as shown in layout result 307. Layout engine 104 also resizes and centers another object (e.g., object 302) in presentation slide 112 in response to the insertion of object 114 into layout segment 206.

Figure 3C:
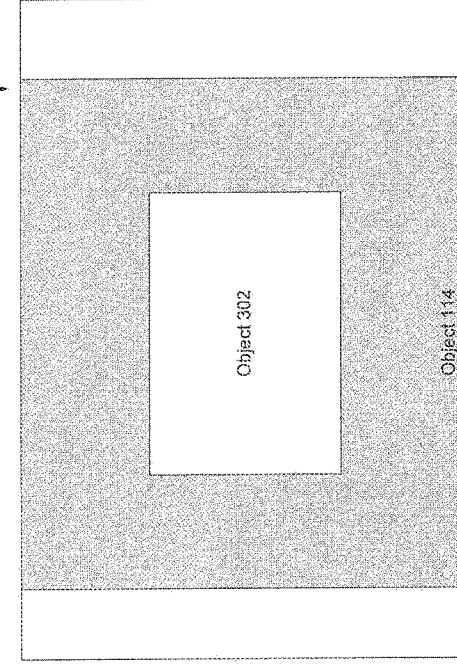
FIG. 3C illustrates a layout result in response to a user inserting an object into a layout segment, according to some embodiments.

In FIG. 3C, layout engine 104 outputs layout result 308 in response to a user inserting an object 114 into layout segment 208. Layout engine 104 resizes and centers object 114 as shown in layout result 308. Layout engine 104 puts object 114 in the background. Layout engine 104 also resizes and centers another object (e.g., object 302) in presentation slide 112 in response to the insertion of object 114 into layout segment 208.

Figure 3D:
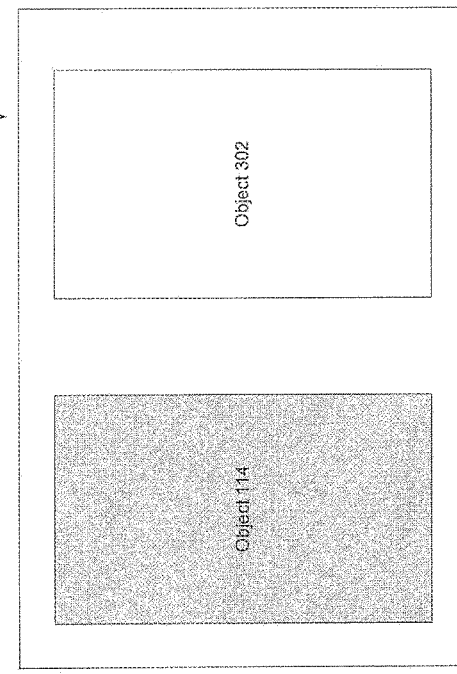
FIG. 3D illustrates a layout result in response to a user inserting an object into a layout segment, according to some embodiments.

In FIG. 3D, layout engine 104 outputs layout result 309 in response to a user inserting an object 114 into layout segment 210. Layout engine 104 resizes and repositions object 114 as shown in layout result 309. Layout engine 104 also resizes and repositions another object (e.g., object 302) in presentation slide 112 in response to the insertion of object 114 into layout segment 210.

Figure 4:
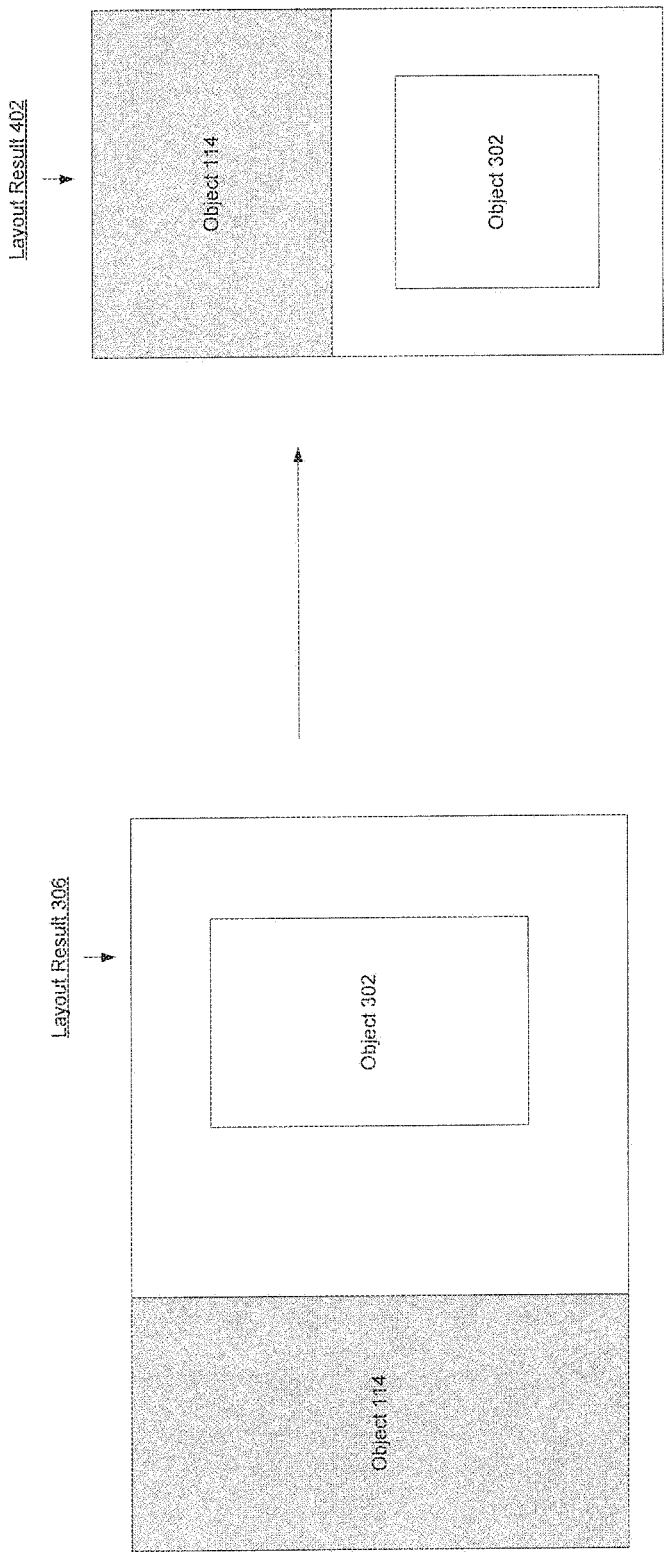
FIG. 4 illustrates how a layout result is updated for display on a different electronic device, according to some embodiments.

FIG. 4 illustrates how layout result 306 in FIG. 3A is updated for display on a different electronic device, according to example embodiments. FIG. 4 is discussed with respect to FIGS. 1, 2, and 3A.

In FIG. 4, layout result 306 illustrates the size and position of objects 114 and 302 based on the insertion of object 114 into layout segment 204. Layout result 306 may represent a layout of objects 114 and 302 in presentation slide 112 when presentation slide 112 is projected on a large display screen.

In FIG. 4, layout engine 104 outputs layout result 402 in response to presentation slide 112 being displayed on a small display screen electronic device such as a smartphone. For example, device analyzer 110 determines that the electronic device displaying presentation slide 112 has a small display screen size and a portrait oriented display screen. Layout engine 104 applies a different set of one or more layout rules from layout rules 106 in response to the determination that the electronic device displaying presentation slide 112 has a small display screen size and a portrait oriented display screen. In other words, layout engine 104 may apply two sets of layout rules in response to object 114 being in layout segment 204: a first set of layout rules for a large screen electronic device and a second set of layout rules for a small screen (e.g., smartphone) electronic device. As a result, layout engine 402 display object 114 on top of object 302 because the display screen of the smartphone has a portrait orientation.

Figure 5:
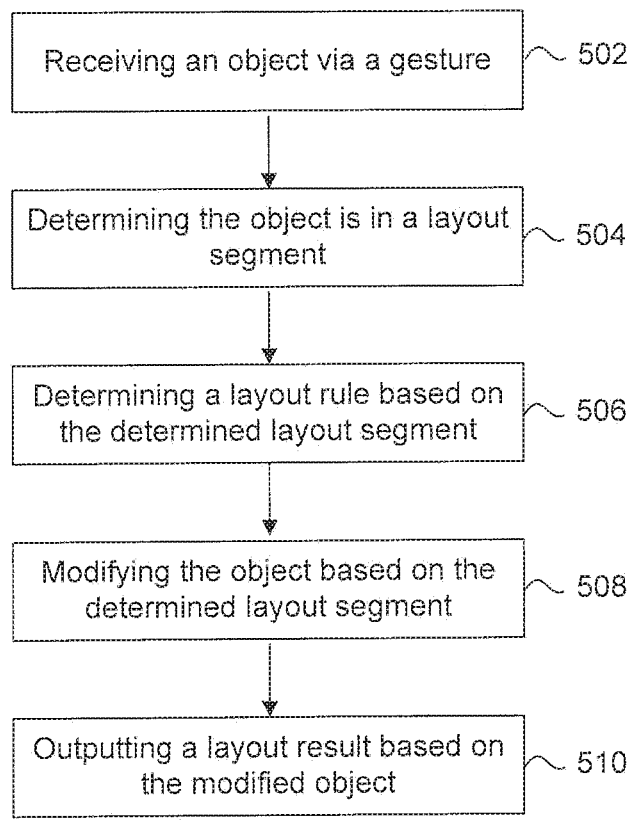
FIG. 5 is a flowchart illustrating a process for performing automatic layout of an object, according to some embodiments.

FIG. 5 is a flowchart for a method 500 for performing automatic layout of an object, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 1. However, method 500 is not limited to that example embodiment.

In 502, layout platform 102 receives an object 114 to be inserted into presentation slide 112 from a user via an input gesture. In some embodiments, layout platform 102 receives the object 114 from a user dragging and dropping the object 114 into presentation slide 112 using a computer mouse, touchpad, or touch gesture.

In 504, layout engine 104 determines that the object 114 is in a layout segment of a plurality of layout segments in presentation slide 112.

In 506, layout engine 104 determines a layout rule in layout rules 106 that is associated with the determined layout segment. In some embodiments, layout engine 104 may determine one or more properties of object 114 using object analyzer 108. Layout engine 104 may then determine a layout rule in layout rules 106 that applies for the determined layout segment and the determined one or more properties of object 114.

In 508, layout engine 104 modifies one or more properties of object 114 based on the determined layout rule. In some embodiments, layout engine 104 applies one or more operations of the determined layout rule to object 114. For example, layout engine 104 may modify the size, position, and or orientation of object 114.

In some embodiments, layout engine 104 may modify one or more properties of other objects in presentation slide 112 based on the determined layout rule. For example, layout engine 104 may modify the size, position, and or orientation of other objects in presentation slide 112 based on the determined layout rule.

In 510, layout engine 104 outputs a layout result 116 representing presentation slide 112 with the one or more modifications to the object 114. In some embodiments, layout result 116 represents presentation slide 112 with the one or more modifications to the object 114 and one or more other objects in presentation slide 112.

Figure 6:
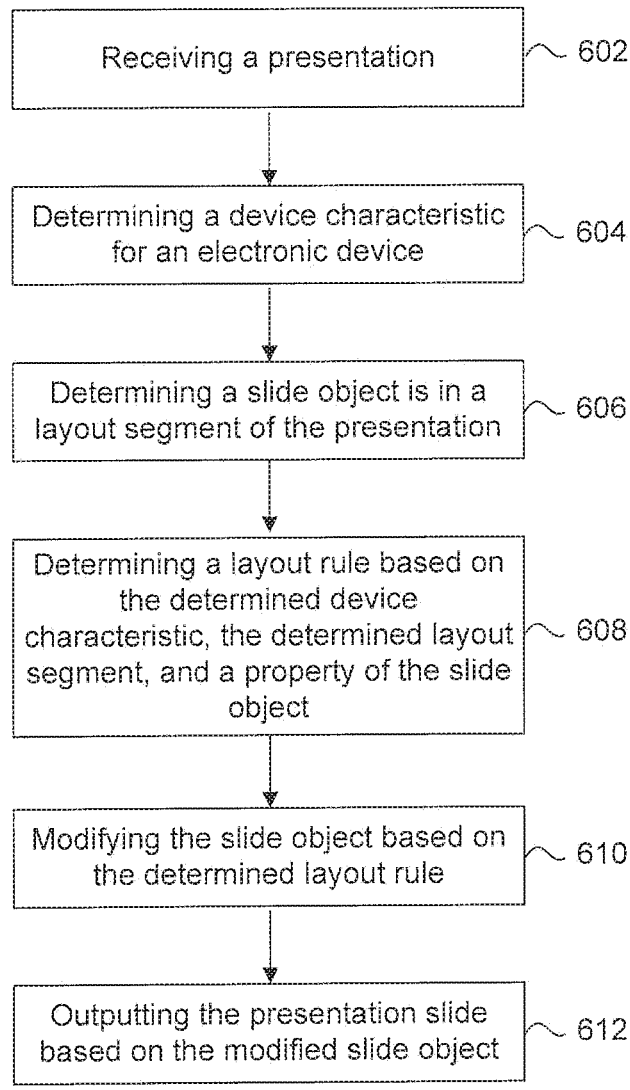
FIG. 6 is a flowchart illustrating a process for displaying a presentation across various electronic devices, according to some embodiments.

FIG. 6 is a flowchart for a method 600 for displaying a presentation across different electronic devices, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 1. However, method 600 is not limited to that example embodiment.

In 602, layout platform 102 receives a presentation slide 112. In some embodiments, presentation slide 112 may contain an object 114. In some embodiments, layout platform 102 may receive presentation slide 112 over a network such as the Internet. For example, layout platform 102 may receive presentation slide 112 over the Internet and store presentation slide 112 in a cloud computing platform.

In 604, device analyzer 110 determines one or more device characteristics for an electronic device that is to display presentation slide 112. In some embodiments, device analyzer 110 determines the display size, display screen orientation, graphical rendering capabilities, power usage characteristics, and or other device characteristics of the electronic device.

In 606, layout engine 104 determines that the object 114 is in a layout segment of a plurality of layout segments in presentation slide 112.

In 606, layout engine 104 determines a layout rule in layout rules 106 that applies for the determined one or more device characteristics of the electronic device, the determined layout segment, and one or more properties of the object 114. In some embodiments, layout engine 104 may determine the one or more properties of object 114 using object analyzer 108. For example, object analyzer 108 may determine the size, position, and or size of the object 114.

In 608, layout engine 104 modifies one or more properties of the object 114 based on the determined layout rule. In some embodiments, layout engine 104 applies one or more operations of the determined layout rule to object 114. For example, layout engine 104 may modify the size, position, and or orientation of the object 114. As would be appreciated by a person of ordinary skill in the art, layout engine 104 may modify other properties of object 114 based on the determined layout rule.

In some embodiments, layout engine 104 may modify one or more properties of other objects in presentation slide 112 based on the determined layout rule. For example, layout engine 104 may modify the size, position, and or orientation of other objects in presentation slide 112 based on the determined layout rule.

In some other embodiments, layout engine 104 may associate one or more actions with the object 114 based on the determined layout rule. For example, layout engine 104 may apply a full screen action to object 114 based on the determined layout rule. As would be appreciated by a person of ordinary skill in the art, various other types of actions may be associated with the object 114 based on the determined layout rule.

In 610, layout engine 104 outputs a layout result 116 representing presentation slide 112 with the one or more modifications to the object 114. In some embodiments, layout result 116 represents presentation slide 112 with the one or more modifications to the object 114 and one or more other objects in presentation slide 112.

Figure 7:
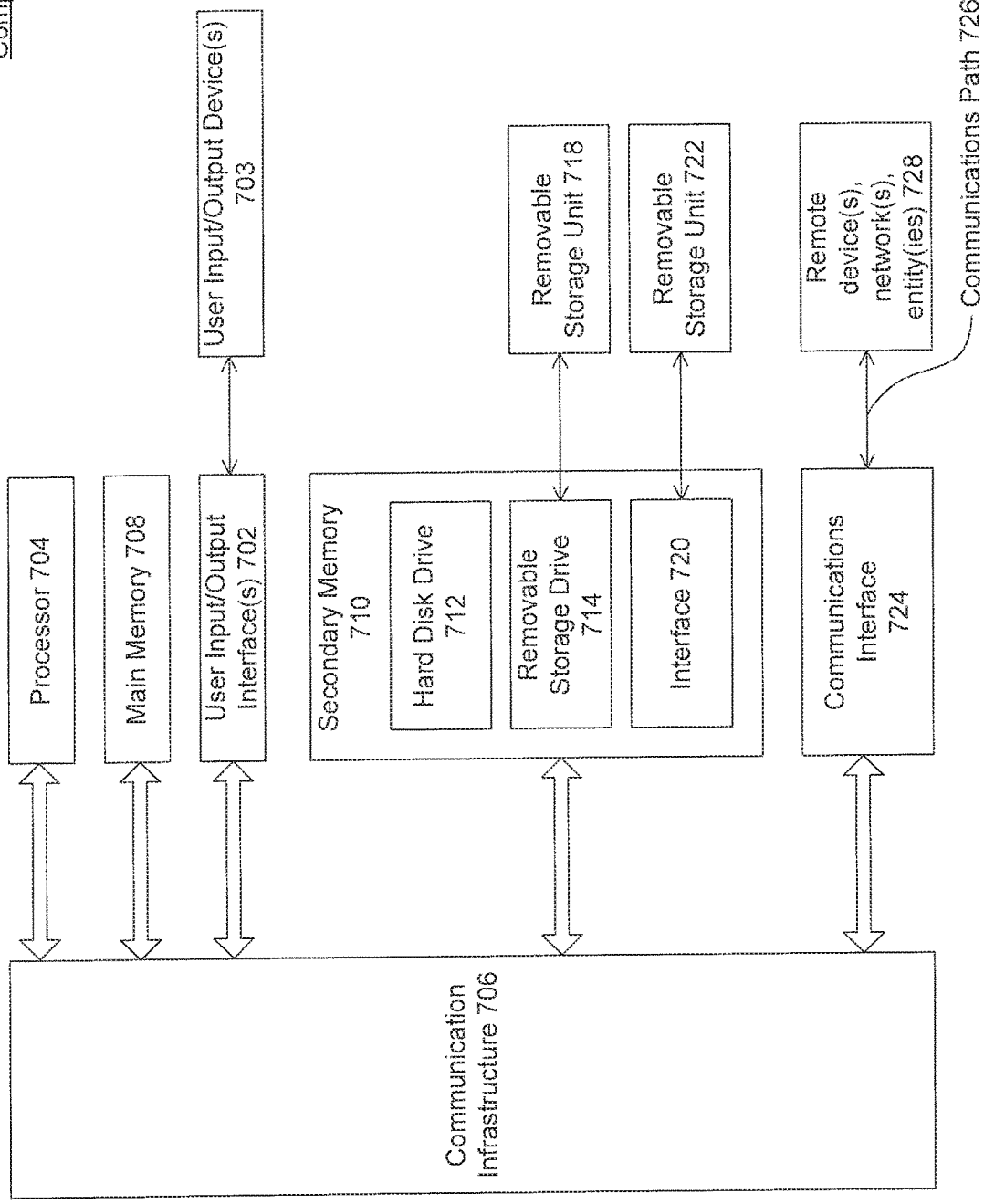
FIG. 7 is an example computer system useful for implementing various embodiments.

Various embodiments can be implemented, for example, using one or more computer systems, such as computer system 700 shown in FIG. 7. Computer system 700 can be used, for example, to implement method 500 of FIG. 5. For example, computer system 700 can perform automatic layout of an object. Computer system 700 can further display a presentation across a plurality of electronic devices, according to some embodiments. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising: implementing, by at least one processor, a graphical user interface comprising a plurality of layout segments on a presentation slide, wherein a first layout segment of the plurality of layout segments is associated with a first layout rule configured to automatically generate a first layout result in response to interactively inserting a first object into the first layout segment, and a second layout segment of the plurality of layout segments is associated with a second layout rule configured to automatically generate a second layout result in response to interactively inserting the first object into the second layout segment;
while displaying a second object on the presentation slide of the graphical user interface, receiving, by the at least one processor, a request to insert the first object in the graphical user interface via an input gesture;
determining, by the at least one processor, whether the inserted first object corresponds to the first layout segment of the plurality of layout segments or the second layout segment of the plurality of layout segments;
in response to determining whether the inserted first object corresponds to the first layout segment of the plurality of layout segments or the second layout segment of the plurality of layout segments:
modifying, by the at least one processor, at least one of a size and position of the second object in accordance with the first layout rule based on a determination that the inserted first object corresponds to the first layout segment; and
modifying, by the at least one processor, at least one of the size and the position of the second object in accordance with the second layout rule based on a determination that the inserted first object corresponds to the second layout segment; and
concurrently displaying, by the at least one processor, the inserted first object and the modified second object on the presentation slide of the graphical user interface.

2. The method of claim 1, the modifying the second object further comprising:
modifying at least one of an orientation of the second object and a color of the second object based on a determination that the inserted first object corresponds to the first layout segment.

3. The method of claim 1, wherein the first object is a picture, shape, video, animation, or text block.

4. The method of claim 1, the implementing the graphical user interface further comprising:
defining the plurality of layout segments based on a plurality of gridlines.

5. The method of claim 1, further comprising:
defining the first layout rule in a configuration file based on a set of style preferences.

6. The method of claim 1, wherein the plurality of layout segments correspond to visual divisions of the presentation slide.

7. A system, comprising:
a memory; and
at least one processor coupled to the memory and configured to:
implement a graphical user interface comprising a plurality of layout segments on a presentation slide, wherein a first layout segment of the plurality of layout segments is associated with a first layout rule configured to automatically generate a first layout result in response to interactively inserting a first object into the first layout segment, and a second layout segment of the plurality of layout segments is associated with a second layout rule configured to automatically generate a second layout result in response to interactively inserting the first object into the second layout segment;
while a second object is being displayed on the presentation slide of the graphical user interface, receive a request to insert the first object in the graphical user interface via an input gesture;
determine whether the inserted first object corresponds to the first layout segment of the plurality of layout segments or the second layout segment of the plurality of layout segments;
in response to determining whether the inserted first object corresponds to the first layout segment of the plurality of layout segments or the second layout segment of the plurality of layout segments:

modify at least one of a size and position of the second object in accordance with the first layout rule based on a determination that the inserted first object corresponds to the first layout segment; and modify at least one of the size and the position of the second object in accordance with the second layout rule based on a determination that the inserted first object corresponds to the second layout segment; and concurrently display the inserted first object and the modified second object on the presentation slide of the graphical user interface.

8. The system of claim 7, wherein, to modify the second object, the at least one processor is further configured to:

modify at least one of an orientation of the second object and a color of the second object based on a determination that the inserted first object corresponds to the first layout segment the determined first layout rule.

9. The system of claim 7, wherein the first object is a picture, shape, video, animation, or text block.

10. The system of claim 7, wherein, to implement the graphical user interface, the at least one processor is further configured to:

define the plurality of layout segments based on a plurality of gridlines.

11. The system of claim 7, wherein the at least one processor is further configured to:

define the first layout rule in a configuration file based on a set of style preferences.

12. A non-transitory computer-readable device having instructions stored thereon that, when executed by at least one computing device, causes the at least one computing device to perform operations comprising:

Implementing a graphical user interface comprising a plurality of layout segments on a presentation slide, wherein a first layout segment of the plurality of layout segments is associated with a first layout rule configured to automatically generate a first layout result in response to interactively inserting a first object into the first layout segment, and a second layout segment of the plurality of layout segments is associated with a second layout rule configured to automatically generate a second layout result in response to interactively inserting the first object into the second layout segment;

while displaying a second object on the presentation slide of the graphical user interface, receiving a request to insert the first object in the graphical user interface via an input gesture;

determining whether the inserted first object corresponds to the first layout segment of the plurality of layout segments or the second layout segment of the plurality of layout segments;

in response to determining whether the inserted first object corresponds to the first layout segment of the plurality of layout segments or the second layout segment of the plurality of layout segments:

modifying at least one of a size and position of the second object in accordance with the first layout rule based on a determination that the inserted first object corresponds to the first layout segment; and modifying at least one of the size and the position of the second object in accordance with the second layout rule based on a determination that the inserted first object corresponds to the second layout segment; and concurrently displaying, by the at least one processor, the inserted first object and the modified second object on the presentation slide of the graphical user interface.

13. The non-transitory computer-readable device of claim 12, the modifying the second object comprising:

modifying at least one of an orientation of the second object and a color of the second object based on a determination that the inserted first object corresponds to the first layout segment.

14. The non-transitory computer-readable device of claim 12, wherein the first object is a picture, shape, video, animation, or text block.

15. The non-transitory computer-readable device of claim 12, the operations further comprising:

defining the first layout rule in a configuration file based on a set of style preferences.

* * * * *